United States Patent
Ryan et al.

(10) Patent No.: US 8,338,552 B2
(45) Date of Patent: Dec. 25, 2012

(54) CO-POLYMER FILMS FOR SENSORS

(75) Inventors: Margaret A. Ryan, Pasasdena, CA (US); Margie L. Homer, Pasadena, CA (US); Shiao-Pin S. Yen, Altadena, CA (US); Adam Kisor, Pasadena, CA (US); April D. Jewell, Somerville, MA (US); Abhijit V. Shevade, Altadena, CA (US); Kenneth S. Manatt, Tujunga, CA (US); Charles Taylor, Claremont, CA (US); Mario Blanco, Temple City, CA (US); William A. Goddard, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 94 days.

(21) Appl. No.: 12/947,598

(22) Filed: Nov. 16, 2010

(65) Prior Publication Data

US 2011/0060114 A1    Mar. 10, 2011

Related U.S. Application Data

(62) Division of application No. 11/820,472, filed on Jun. 19, 2007, now Pat. No. 7,858,720.

(60) Provisional application No. 60/814,730, filed on Jun. 19, 2006.

(51) Int. Cl.
*C08F 26/06* (2006.01)
*C08F 126/06* (2006.01)
(52) U.S. Cl. ........................... 526/260; 526/265
(58) Field of Classification Search ............ 526/260, 526/265
See application file for complete search history.

(56) References Cited

U.S. PATENT DOCUMENTS 5,543,326 A * 8/1996 Heller et al. ............ 204/403.14

* cited by examiner

*Primary Examiner* — Ling Choi
*Assistant Examiner* — Chun-Cheng Wang
(74) *Attorney, Agent, or Firm* — Berliner & Associates

(57) ABSTRACT

Embodiments include a sensor comprising a co-polymer, the co-polymer comprising a first monomer and a second monomer. For some embodiments, the first monomer is poly-4-vinyl pyridine, and the second monomer is poly-4-vinyl pyridinium propylamine chloride. For some embodiments, the first monomer is polystyrene and the second monomer is poly-2-vinyl pyridinium propylamine chloride. For some embodiments, the first monomer is poly-4-vinyl pyridine, and the second monomer is poly-4-vinyl pyridinium benzylamine chloride. Other embodiments are described and claimed.

11 Claims, 4 Drawing Sheets

CO-POLYMER FILMS FOR SENSORS

CROSS-REFERENCE TO RELATED APPLICATIONS

This application is a divisional of application Ser. No. 11/820,472, filed on Jun. 19, 2007 now U.S. Pat. No. 7,858,720, which claims the benefit of U.S. Provisional Application No. 60/814,730, filed 19 Jun. 2006.

GOVERNMENT INTEREST

The invention described herein was made in the performance of work under a NASA contract, and is subject to the provisions of Public Law 96-517 (35 USC 202) in which the Contractor has elected to retain title.

FIELD

The present invention relates to co-polymers.

BACKGROUND

Gas detecting sensors have many applications. One such application is to detect the presence of a dangerous gas, or to detect a gas whose presence indicates a dangerous situation. For example, NASA (National Aeronautics and Space Association) researches are interested in detecting low concentrations of sulfur dioxide ($SO_2$) in closed environments, such as for example aboard the international space station or the space shuttle. $SO_2$ could be a probable breakdown product from leaking lithium-thionyl chloride batteries. $SO_2$ is a colorless gas or liquid under pressure with a pungent odor. Inhalation or exposure could have adverse effects on human health.

During regeneration of a gas detecting sensor, the detected gas is released from the sensor into the environment after detection and after the gas is no longer present in the environment at any appreciable concentrations, so that the sensor may be used again. Most of the previously reported sensor materials for $SO_2$ detection use relatively harsh conditions for regeneration and operation.

DESCRIPTION OF EMBODIMENTS

In the description that follows, the scope of the terms "some embodiments" or "embodiments" is not to be so limited as to mean more than one embodiment, but rather, the scope may include one embodiment, more than one embodiment, or perhaps all embodiments.

Figure 1:
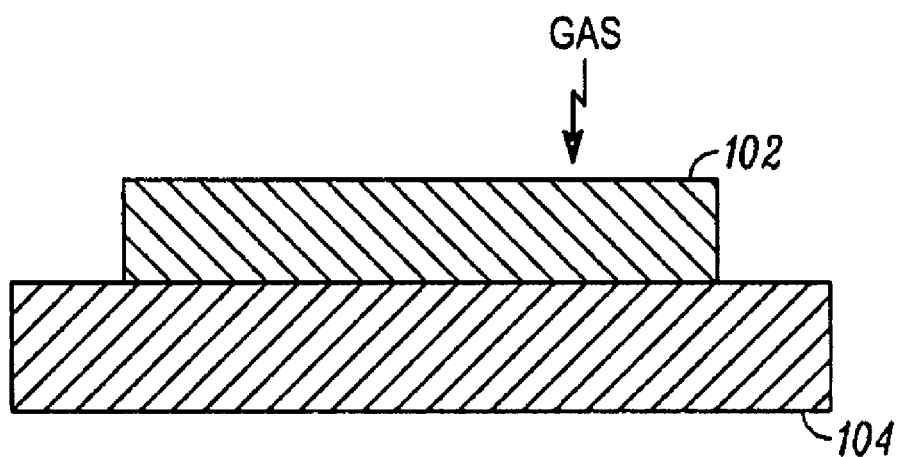
FIG. 1 illustrates a co-polymer film gas sensor according to an embodiment of the present invention.

FIG. 1 illustrates a gas sensor according to an embodiment, where film 102 is formed on substrate 104. Film 102 includes a co-polymer, where the co-polymer absorbs, or adsorbs, the gas, or gases, of interest. It is not known at this time if films according to the described embodiments absorb detectable gases, adsorb detectable gases, or some combination thereof. Accordingly, because the term sorption refers to the action of either absorption or adsorption, the term sorption and its variations will be used, indicating that a substance may be adsorbed, absorbed, or some combination thereof.

Substrate 104 may be flexible or rigid, and may be conductive or non-conductive, depending upon the way in which the sorbed gas is detected. Sorption of the gas, or gases, of interest causes a change in one or more physical properties of film 102. By measuring this change, detection of a sorbed gas may be accomplished, provided the change is sufficiently large to allow a measurement.

For example, for some embodiments, substrate 104 may be formed from silicon dioxide, and film 102 includes carbon so that the electrical resistance of the carbon changes, depending upon the sorption of gas by the polymer included in film 102. In this way, a resistance measuring device, in combination with the system of FIG. 1, may provide for the detection of a sorbed gas. Other embodiments may be based upon changes in other physical properties of film 102. For example, sorption of a gas increases the mass of the resulting system, so that a measuring device sensitive to mass change may be used in the detection of the sorbed gas. As another example, the sorption of gas by a co-polymer in film 102 may cause swelling, causing dispersion in an acoustic wave traveling through the system comprised of substrate 104 and film 102. Accordingly, an acoustic measuring system may be part of a gas sensor system.

Figure 2:
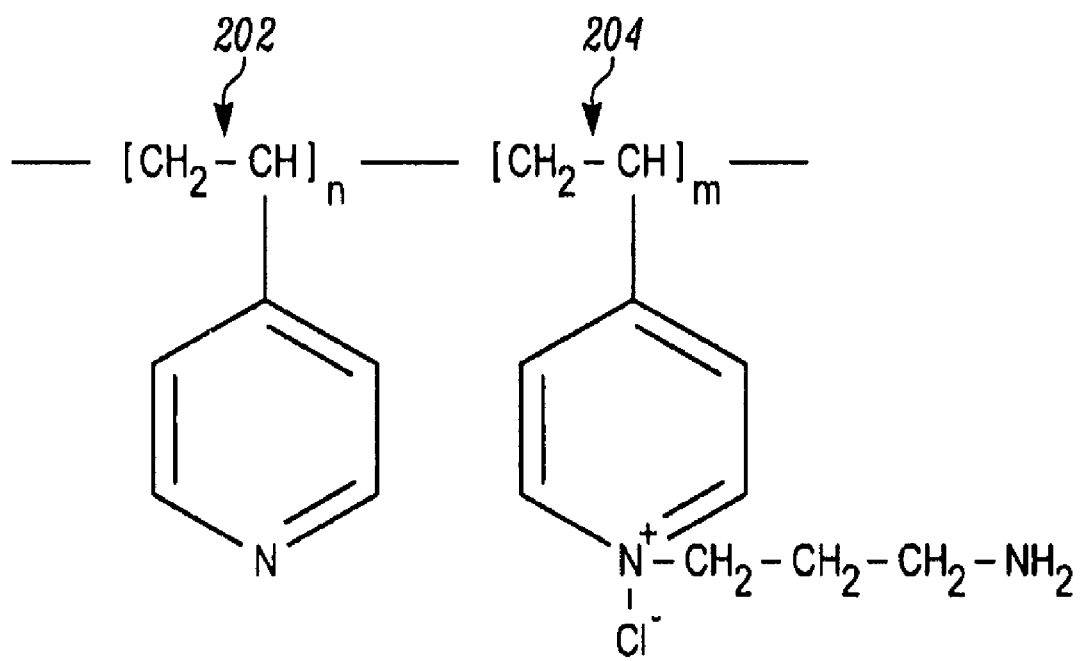
FIG. 2 illustrates a co-polymer according to an embodiment of the present invention.

Film 102 includes co-polymers according to embodiments. More particularly, embodiments include co-polymers comprising two monomers. According to some embodiments, a co-polymer may comprise a combination of vinyl pyridine, and substituted vinyl pyridine or styrene derivative units. A co-polymer comprising two monomers according to an embodiment is illustrated in FIG. 2. Illustrated in FIG. 2 is poly-4-vinyl pyridine monomer 202 and poly-4-vinyl pyridinium propylamine chloride monomer 204. In FIG. 2, the component $CH_2CH$ of poly-4-vinyl pyridine monomer 202 has a subscript n and the component $CH_2CH$ of poly-4-vinyl pyridinium propylamine chloride monomer 204 has a subscript m, where these subscripts indicate relative molar concentrations. For some embodiments, n may range from 0.2 to 0.8, and m may range from 0.8 to 0.2, where n+m=1. This molar ratio may vary for other embodiments. It has been found that a range for n of about 0.4 to 0.7 gave interesting results.

For example, for one particular embodiment, n=0.2 and m=0.8, so that there is one part poly-4-vinyl pyridine to four parts poly-4-vinyl pyridinium propylamine chloride. Such an embodiment was synthesized as follows. 5.25 g (0.05 moles) of poly-4-vinyl pyridine (a molecular weight of about 200K) was dissolved in 25 ml of methanol. The polymer solution was degassed with $N_2$ for 5 min before transferring to a drop funnel. 5 g (0.037 moles) of 3-chloropropylamine, $Cl(CH_2)3NH_2 \cdot HCl$, were dissolved in 10 ml water and passed through a 3.8×30.5 cm column packed with Dowex® M43. Dowex M43 is manufactured by Dow Chemical Company, a Delaware corporation with headquarters in Midland, Mich., USA, and Dowex is a registered trademark of Dow Chemical Company. Prior to use, the Dowex M43 column was washed with 10 ml of water and four times with 12.5 ml of methanol. The final 12.5 ml of methanol solution wash had a pH of 7. The resulting total volume of 3-chloropropylamine solution, ml (20 ml of water plus 50 ml of methanol), was placed in a 500 ml glass reactor. The solution was degassed continuously with $N_2$.

The poly-4-vinyl pyridine solution was placed in a dropping funnel by adding drop-wise, with constant stirring applied to the 3-chloropropylamine solution. The reaction was carried out under a $N_2$ atmosphere, first at 43° C. for 4 hrs, and then at room temperature for 40 hrs.

The product solution was poured into a glass dish and methanol-evaporated to dryness under a flow of $N_2$ at 40° C. Water that separates out was removed continuously. The product was evaporated to dryness, and then vacuum-dried at 47° C. for 24 hrs.

The above description to synthesize an embodiment with n=0.2 and m=0.8 is merely an example of one method. Other synthesis methods may be used to provide such an embodiment, or other embodiments.

As another example, an embodiment may have relative molar concentrations of n=0.5 and m=0.5, so that there are equal parts of poly-4-vinyl pyridine and poly-4-vinyl pyridinium propylamine chloride. Such an embodiment was synthesized as follows. 5.25 g (0.05 moles) of poly-4-vinyl-pyridine (a molecular weight of about 200K) was dissolved in 25 ml of methanol in a flask. The polymer solution was degassed with $N_2$ for 5 min before transferring it to a drop funnel. 3.25 g (0.025 moles) of 3-chloropropylamine, $Cl(CH_2)_3NH_2 \cdot HCl$, was dissolved in 10 ml of water and passed through a 3.8 by 30.5 cm column packed with Dowex M43. Prior to use, the Dowex M43 column was washed with 10 ml of water, and four times with 12.5 ml of methanol. The final 12.5 ml methanol wash had a pH of 7. The total volume of 3-chloropropylamine solution, 66 ml (16 ml of water plus 50 ml of methanol), was placed in a 500 ml glass reactor. The solution was degassed continuously with $N_2$.

The poly-4-vinyl pyridine solution was placed in the dropping funnel by adding drop-wise, with constant stirring applied to the 3-chloropropylamine solution in the reactor. The reaction was carried out under $N_2$ atmosphere, first at 43° C. for 4 hrs, and then at room temperature for 40 hrs.

The product solution was poured into a glass dish and methanol was evaporated in a hood at 40° C. with $N_2$. The evaporation was continued until a dry polymer film was obtained. Water that separates out was removed continuously from the dish. Finally, the polymer film in the glass dish was vacuum-dried at 60° C. for 64 hrs.

The above description to synthesize an embodiment with n=0.5 and m=0.5 is merely an example of one method. Other synthesis methods may be used to provide such an embodiment, or other embodiments.

Figure 3:
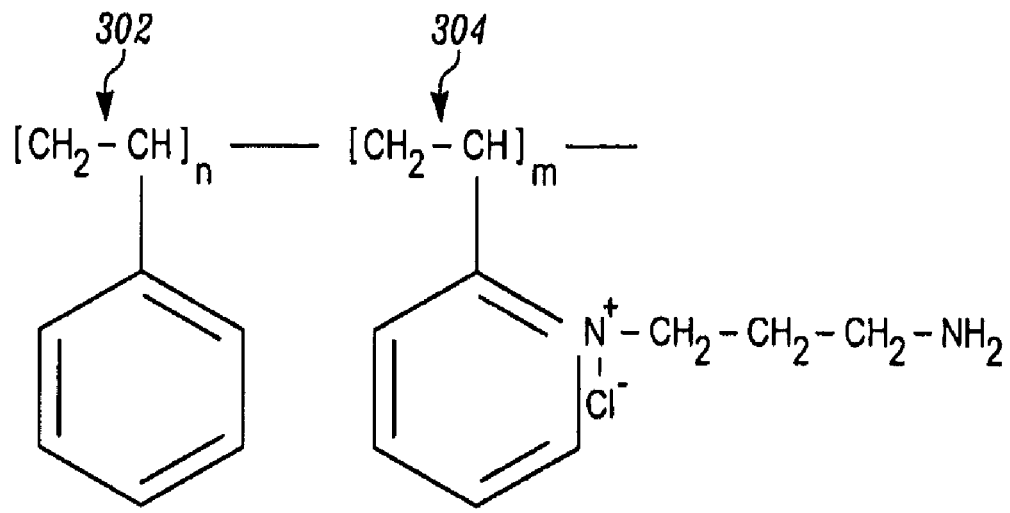
FIG. 3 illustrates a co-polymer according to an embodiment of the present invention.
Figure 4:
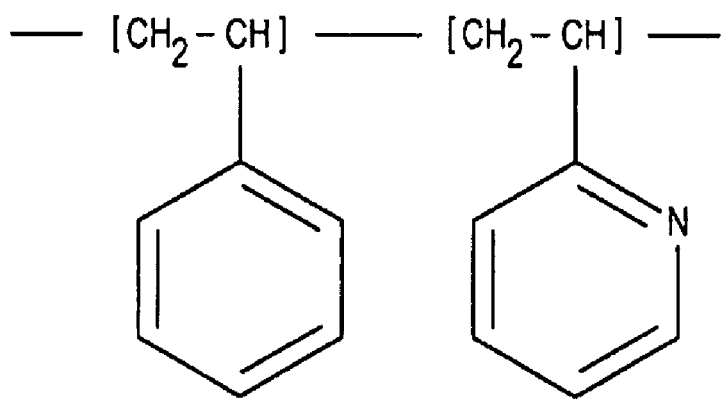
FIG. 4 illustrates a prior art polymer used as starting material for the embodiment of FIG. 3.

A co-polymer according to another embodiment is illustrated in FIG. 3, with polystyrene monomer 302 and poly-2-vinyl pyridinium propylamine chloride monomer 304. The subscripts n and m may vary over range of values, as described with respect to the embodiments represented by FIG. 2. An embodiment according to FIG. 3 for n=0.3 and m=0.7 was synthesized as follows. A readily available co-polymer material, polystyrene-poly-2-vinyl pyridine, was used as a starting material. FIG. 4 illustrates a polystyrene-poly-2-vinyl pyridine monomer. 7.33 g (0.07 moles) of a copolymer of polystyrene-poly-2-vinyl pyridine containing 0.049 moles of the pyridine group was dissolved in 40 ml of methanol in a flask and degassed with $N_2$ for 5 min and then transferred to a drop funnel.

9.1 g (0.07 moles) of 3-chloropropylamine, $Cl(CH_2)_3NH_2 \cdot HCl$ (with a molecular weight of about 130K) were dissolved in 40 ml of water and passed through a 1.5 by 12 inch Dowex M43 column. The Dowex M-43 column, prior to use, was washed four times with 30 ml of methanol. The final methanol wash had a pH of 7. The total volume of 3-chloropropylamine solution, 160 ml, was placed in a 500 ml glass reactor. The solution was degassed continuously with $N_2$.

The co-polymer solution was placed in a dropping funnel and added drop-wise, constantly stirring the 3-chloropropylamine solution in the reactor. The reaction was carried out under $N_2$ atmosphere at room temperature for 40 hrs, and at 43° C. for 24 hrs.

The solution after reaction was poured into a glass dish and methanol was evaporated in a hood with $N_2$ at 43° C. Water that separates out was removed continuously from the dish. The evaporation was continued until a dry polymer film was obtained. Finally, the polymer film in the glass dish was vacuum-dried at 60° C. for 24 hrs.

The above description to synthesize an embodiment with n=0.3 and m=0.7 is merely an example of one method. Other synthesis methods may be used to provide such an embodiment, or other embodiments.

Figure 5:
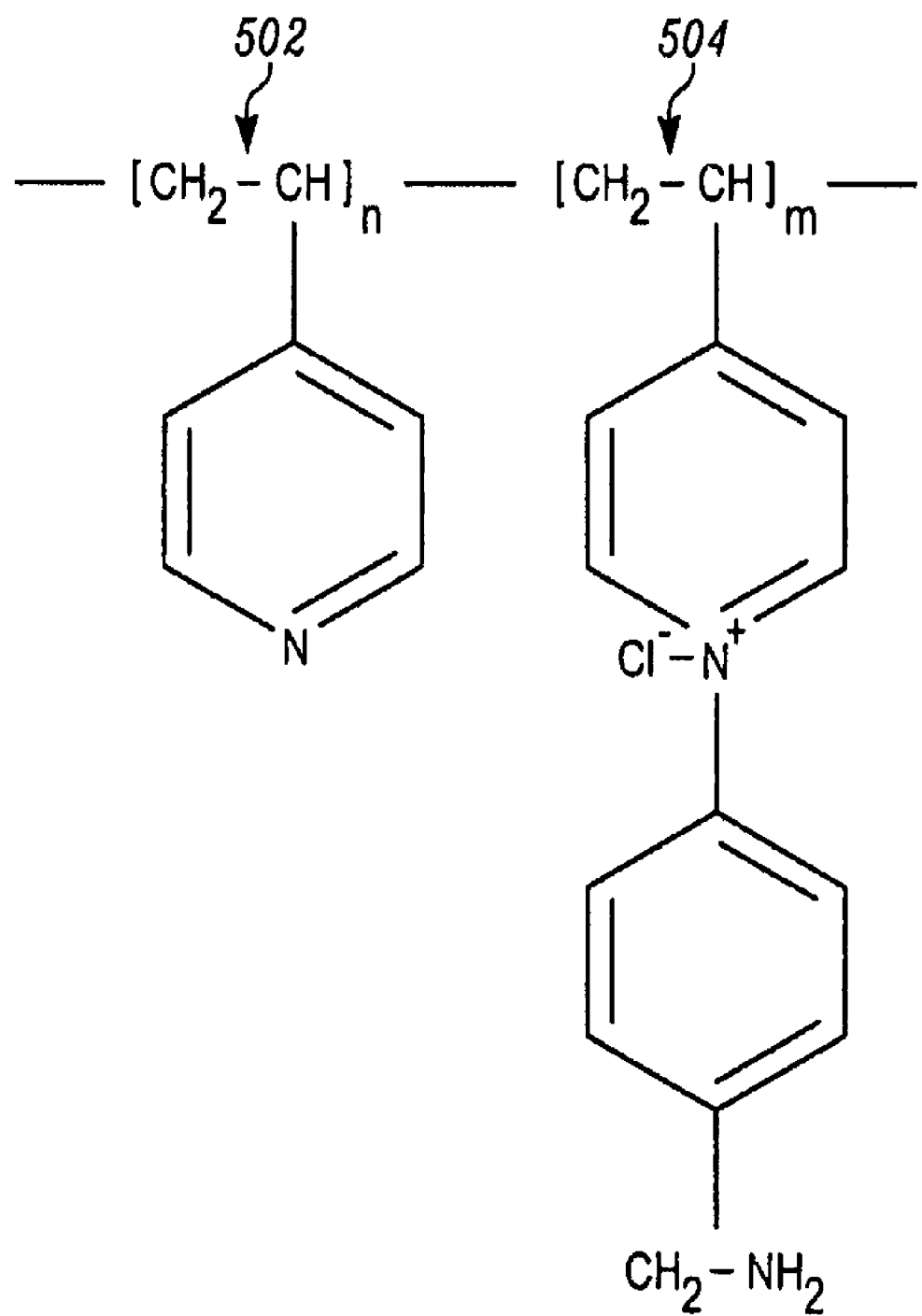
FIG. 5 illustrates a co-polymer according to an embodiment of the present invention.

FIG. 5 illustrates another co-polymer according to an embodiment, comprising poly-4-vinyl pyridine monomer 502 and poly-4-vinyl pyridinium benzylamine chloride monomer 504. For some embodiments n may range from 0.2 to 0.8 and m may range from 0.8 to 0.2. This molar ratio may vary for other embodiments. It has been found that a range for n of about 0.4 to 0.7 gives interesting results.

One particular embodiment n=0.5 and m=0.5, where there are equal parts of poly-4-vinyl pyridine and poly-4-vinyl pyridinium benzylamine chloride, was synthesized as follows. 5.25 gm (0.05 moles) of poly-4-vinyl pyridine (molecular weight of about 200K) was dissolved in 50 ml methanol in a flask. The polymer solution was degassed with $N_2$ for 5 minutes before 3.9 gm (0.025 moles) of 2-(4-chlorophenyl) ethyl amine (98% pure) was added drop-wise. The reaction was carried out under $N_2$, with constant stirring at 43° C. for 4 hrs and then at room temperature for 106 hrs.

The product solution was filtered and placed into a glass dish and methanol-evaporated in a hood at 40° C. with $N_2$. The evaporation was continued until dry polymer film was obtained. The polymer film in the glass dish was vacuum dried at 60° C. for 24 hrs.

The above description to synthesize an embodiment with n=0.5 and m=0.5 is merely an example of one methods. Other synthesis methods may be used to provide such an embodiment or other embodiments.

It was found that the above-described embodiments are of utility in the detection of $SO_2$ gas. For example, for an embodiment according to FIG. 2, it was found that for n=m=0.5, $SO_2$ with concentrations as low as 0.2 ppm was detected. Furthermore, films based upon the above-described co-polymers allow for regeneration at temperatures below 40° C. Embodiments are not necessarily limited to the detection of $SO_2$ gas. For example, the described embodiment co-polymers may find utility in sensors for Hg, $CO_2$, organic and inorganic vapors, and other gases. Furthermore, the described embodiments may not necessarily be limited to detecting gas, but may be of utility in detecting liquids, such as possibly detecting organic solvents.

Figure 6:
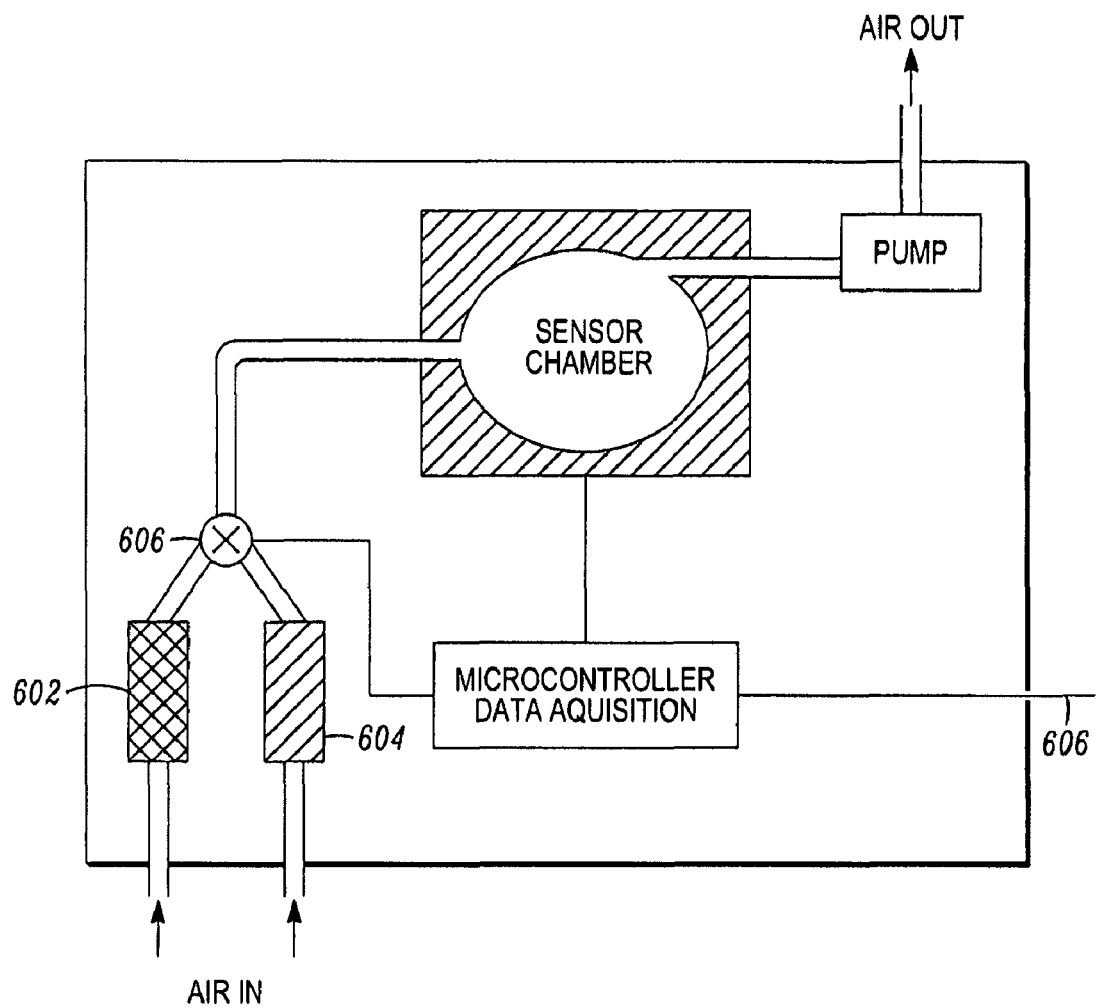
FIG. 6 illustrates a gas sensor system according to an embodiment of the present invention.

The sensors described above may be integrated in a system for detecting gas. One such embodiment is illustrated in FIG. 6. The sensor chamber includes a co-polymer film according to the described embodiments. When the device is operating, air is pumped from the surroundings into the sensor chamber. The air is directed either through activated charcoal filter 602, which is put in line to provide clean air for baseline data, or though a dummy filter of glass beads, dummy filter 604, which is put in line to provide a pressure drop similar to that due to charcoal filter 602. Solenoid valve 606 is programmed to open the path to charcoal filter 602 and provide clean airflow for a pre-selected period of time at selected time intervals; otherwise, the air is directed through filter 604. Air then enters the sensing chamber, and resistance is measured. Deviations from the clean air baseline are recorded as changes in resistance of the sensor in the sensor chamber. Other embodiments may measure physical properties other than resistance.

The microcontroller and data acquisition module controls the various components, measures resistance, and records the acquired data, which may include analog-to-digital conversion. Bus 606 provides an interconnect to other external components, such as a computer.

It should be appreciated that the chemical compositions illustrated in the above-described embodiments are particular examples, and that co-polymers may be synthesized with different monomers than those described above, or with the same monomers but in different combinations. As a particular example, referring to FIG. 3, a poly-4-vinyl pyridinium propylamine chloride monomer may be substituted for poly-2-vinyl pyridinium propylamine chloride monomer 304. The synthesis is similar to that described with respect to FIG. 3, except that a solvent comprising both methanol and THF (tetrahydrofuran) may be used.

More generally, monomer 204 belongs to a family, which may be termed a pyridinium alkyl amine halide family; monomer 202 belongs to a family, which may be termed a pyridine family; monomer 302 belongs to a family, which may be termed a polystyrene; and monomer 504 belongs to a family, which may be termed an aryl pyridinium alkyl amine halide. Accordingly, other embodiment co-polymers may be synthesized in which other monomers from these families make up the co-polymers.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. Accordingly, various modifications may be made to the described embodiments without departing from the scope of the invention as claimed below.

What is claimed is:

1. An $SO_2$ gas sensor comprising an $SO_2$ sorbing co-polymer, the co-polymer comprising:
   a first monomer selected from monomers belonging to the polystyrene family; and
   a second monomer selected from the group consisting of monomers belonging to the pyridinium alkyl amine halide family and monomers belonging to the aryl pyridinium alkyl amine halide family.

2. The gas sensor as set forth in claim 1, further comprising:
   a substrate, wherein the co-polymer is formed on the substrate as a film.

3. An $SO_2$ gas sensor comprising an $SO_2$ sorbing co-polymer, the co-polymer comprising:
   a first monomer selected from the group consisting of monomers belonging to the pyridine family and monomers belonging to the polystyrene family; and
   a second monomer selected from the group consisting of monomers belonging to the pyridinium alkyl amine halide family and monomers belonging to the aryl pyridinium alkyl amine halide family;
   the first monomer comprising poly-4-vinyl pyridine, and the second monomer comprising poly-4-vinyl pyridinium propylamine chloride.

4. The gas sensor as set forth in claim 3, wherein the first monomer is at a relative molar concentration in a range of 0.2 to 0.8, and the second monomer is at a relative molar concentration in the range of 0.2 to 0.8.

5. The gas sensor as set forth in claim 3, wherein the co-polymer is such that there is one part of the first monomer to four parts of the second monomer, or one part of the first monomer to one part of the second monomer.

6. An $SO_2$ gas sensor comprising an $SO_2$ sorbing co-polymer, the co-polymer comprising:
   a first monomer selected from the group consisting of monomers belonging to the pyridine family and monomers belonging to the polystyrene family; and
   a second monomer selected from the group consisting of monomers belonging to the pyridinium alkyl amine halide family and monomers belonging to the aryl pyridinium alkyl amine halide family;
   the first monomer comprising polystyrene, and the second monomer comprising poly-2-vinyl pyridinium propylamine chloride.

7. The gas sensor as set forth in claim 6, wherein the first monomer is at a relative molar concentration in a range of 0.2 to 0.8, and the second monomer is at a relative molar concentration in the range of 0.2 to 0.8.

8. The gas sensor as set forth in claim 6, wherein the co-polymer is such that the first and second monomers are at relative molar concentrations of 0.3 and 0.7, respectively.

9. An $SO_2$ gas sensor comprising an $SO_2$ sorbing co-polymer, the co-polymer comprising:
   a first monomer selected from the group consisting of monomers belonging to the pyridine family and monomers belonging to the polystyrene family; and
   a second monomer selected from the group consisting of monomers belonging to the pyridinium alkyl amine halide family and monomers belonging to the aryl pyridinium alkyl amine halide family;
   the first monomer comprising poly-4-vinyl pyridine, and the second monomer comprising poly-4-vinyl pyridinium benzylamine chloride.

10. The gas sensor as set forth in claim 9, wherein the first monomer is at a relative molar concentration in a range of 0.2 to 0.8, and the second monomer is at a relative molar concentration in the range of 0.2 to 0.8.

11. The gas sensor as set forth in claim 9, wherein the co-polymer is such that there is one part of the first monomer to one part of the second monomer.

* * * * *